(12) United States Patent
Jang et al.

(10) Patent No.: US 8,368,091 B2
(45) Date of Patent: Feb. 5, 2013

(54) NANOCRYSTAL MIXTURE AND LIGHT-EMITTING DIODE USING THE SAME

(75) Inventors: Eun Joo Jang, Suwon-si (KR); Byung Ki Kim, Gunpo-si (KR); Shin Ae Jun, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 748 days.

(21) Appl. No.: 12/112,272

(22) Filed: Apr. 30, 2008

(65) Prior Publication Data

US 2009/0321755 A1 Dec. 31, 2009

(30) Foreign Application Priority Data

Aug. 23, 2007 (KR) .................. 10-2007-0084847

(51) Int. Cl.
*H01L 29/20* (2006.01)
(52) U.S. Cl. .................. 257/89; 257/E33.061
(58) Field of Classification Search ............... 257/42, 257/43, 89, 98, 100, E33.059, E33.061, E33.013, 257/E33.055
See application file for complete search history.

(56) References Cited

U.S. PATENT DOCUMENTS

| | | | |
|---|---|---|---|
| 6,864,626 B1 * | 3/2005 | Weiss et al. | 313/503 |
| 2006/0043361 A1 * | 3/2006 | Lee et al. | 257/40 |
| 2006/0157686 A1 * | 7/2006 | Jang et al. | 257/14 |
| 2006/0244358 A1 * | 11/2006 | Kim et al. | 313/486 |
| 2007/0034833 A1 | 2/2007 | Parce et al. | |
| 2007/0172427 A1 * | 7/2007 | Barchi et al. | 424/9.34 |

FOREIGN PATENT DOCUMENTS

| | | |
|---|---|---|
| WO | 03/025539 | 3/2003 |
| WO | 2006/060372 | 6/2006 |

OTHER PUBLICATIONS

European Office Action—EP08158947.5-2111 dated Sep. 10, 2009.
European Search Report—EP08158947.5-2111 dated Dec. 3, 2008.

* cited by examiner

*Primary Examiner* — Ha Tran T Nguyen
*Assistant Examiner* — Vongsavanh Sengdara
(74) *Attorney, Agent, or Firm* — Cantor Colburn LLP

(57) ABSTRACT

Disclosed is a light-emitting device. The light-emitting device comprises a blue light-emitting source and a light-emitting source. The light-emitting source includes first semiconductor nanocrystals and second semiconductor nanocrystals. The first and second nanocrystals emit lights of different wavelengths from each other to produce a color complementary to blue. The first and second semiconductor nanocrystals are spatially clustered to form first and second composites respectively.

8 Claims, 5 Drawing Sheets

NANOCRYSTAL MIXTURE AND LIGHT-EMITTING DIODE USING THE SAME

This application claims priority to Korean Patent Application No. 2007-84847 filed on Aug. 23, 2007, and all the benefits accruing therefrom under 35 U.S.C. §119(a), the contents of which in its entirely are hereby incorporated by reference.

BACKGROUND OF THE INVENTION

The present disclosure relates to a nanocrystal mixture and a light-emitting device using the nanocrystal mixture.

In recent years, semiconductor-based white light-emitting diodes have attracted more and more attention as next-generation replacements for current light-emitting devices due to their excellent characteristics, including prolonged lifetime, prospect of miniaturization, reduced power consumption and environmental friendliness (e.g., mercury free). White light-emitting diodes are currently used in a wide variety of applications, such as backlights for liquid crystal displays and display instrument panels for automotive vehicles.

Particularly, many attempts have been made to manufacture backlights for liquid crystal displays using three-color light-emitting diodes and having a high luminescence efficiency and good color purity. However, disadvantages associated with the use of three-color light-emitting diodes are significant, for example, high fabrication costs and complex driving circuits causing a loss in cost competitiveness. Thus, there exists a need to develop one-chip solutions capable of reducing the fabrication costs and simplifying the structure of devices while maintaining excellent performance characteristics of the devices in terms of luminescence efficiency and color purity.

A combination of YAG:Ce phosphors and a blue light-emitting diode has been employed as a one-chip solution to develop white LEDs. The white LEDs operate in such a way that a portion of blue light from the blue light-emitting diode excites the YAG:Ce phosphors to produce yellow-green light and the blue light is combined with the yellow-green light to emit white light. However, these white LEDs suffer from problems that include a low color rendering index and poor color purity because light from the white LEDs has some spectra in the visible range. Thus, these white LEDs cannot be easily applied to high definition display devices.

Figure 1:
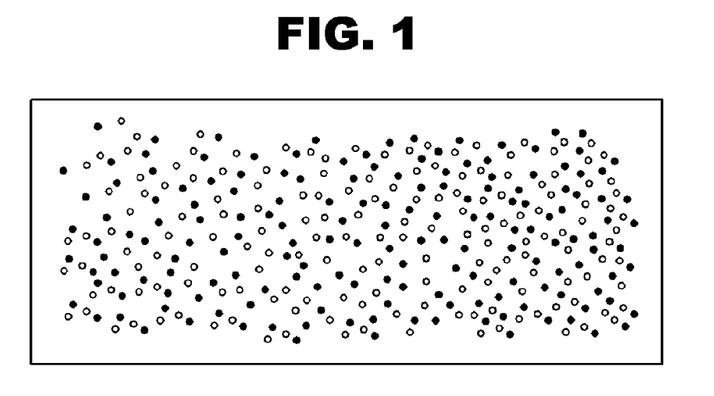
FIG. 1 is a schematic cross-sectional diagram showing light-emitting semiconductor nanocrystal materials distributed in a conventional white light-emitting diode.
Figure 2:
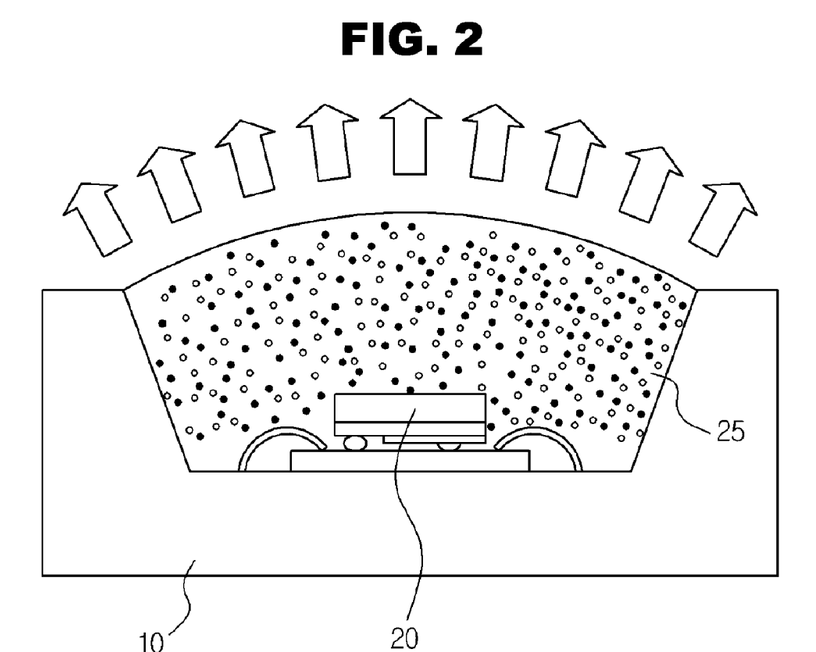
FIG. 2 is a schematic cross-sectional diagram for a conventional white light-emitting diode.

In recent years, an attempt has been made to fabricate a white LED that uses a UV light-emitting diode, which is expected to have high energy efficiency, as an excitation source instead of a blue light-emitting diode. This white LED is fabricated by applying green emitting nanocrystals and red emitting nanocrystals to a blue light-emitting diode, as shown in FIG. 1. Specifically, as shown in FIG. 2, the white light-emitting diode comprises a blue LED 20 mounted on a packaging frame 10 and a light-emitting layer 25 formed on the blue LED wherein the light-emitting layer 25 is formed of a mixture of red emitting nanocrystals, green emitting nanocrystals and a base (e.g., a matrix resin).

Figure 3:
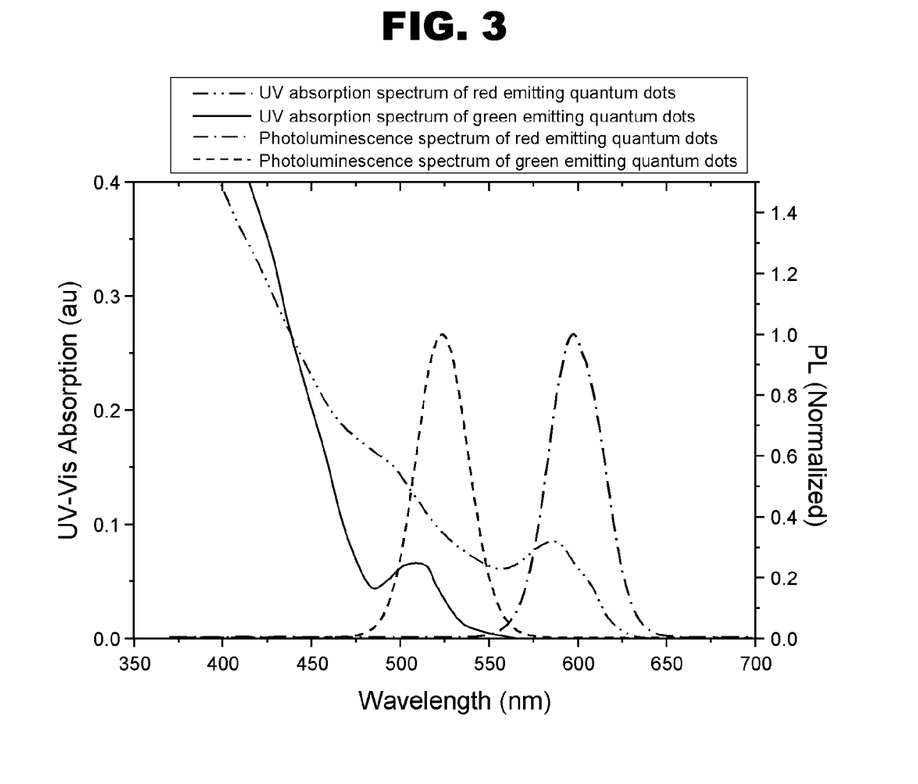
FIG. 3 is a graph showing the UV-VIS absorption spectra and photoluminescence spectra of light-emitting semiconductor nanocrystal materials.

Semiconductor nanocrystals are advantageous in terms of energy conversion due to their small Stokes shift, but may undergo absorption-reabsorption when both red emitting nanocrystals and green emitting nanocrystals are used for the fabrication of a white LED. This absorption-reabsorption takes place between the semiconductor nanocrystals. FIG. 3 is a graph showing UV-VIS absorption spectra and UV-excited photoluminescence spectra of light-emitting semiconductor nanocrystal materials. Particularly, when red emitting nanocrystals absorb light from green emitting nanocrystals, energy transfer between the nanocrystals causes consecutive light down-conversion, reducing efficiency of a light source. This energy transfer occurs more frequently as the distances between the nanocrystals decrease. Therefore, an increase in the concentration of the semiconductor nanocrystals or aggregation of the semiconductor nanocrystals renders the problem more serious.

SUMMARY

Disclosed is a nanocrystal mixture comprising two or more kinds of semiconductor nanocrystals emitting light in different wavelength regions wherein each group of semiconductor nanocrystals with same photo luminescence are passivated in the composites.

The composites may include semiconductor nanocrystals and an organic polymer or a metal oxide.

Disclosed is a white light-emitting diode comprising a blue light-emitting diode and a light-emitting layer formed on the blue light-emitting diode and composed of two or more kinds of semiconductor nanocrystals emitting light in different wavelength regions to produce a color complementary to blue wherein each group of semiconductor nanocrystals with same photo luminescence are passivated in the composites.

Disclosed herein too is a backlight unit comprising the white light-emitting diode.

Disclosed herein too is a display or lighting system comprising the backlight unit.

BRIEF DESCRIPTION OF THE DRAWINGS

The above and other features and advantages of the disclosed embodiments will become more apparent by describing in detail exemplary embodiments thereof, with reference to the attached drawings, in which.

DESCRIPTION OF THE PREFERRED EMBODIMENTS

Exemplary embodiments will now be described in greater detail with reference to the accompanying drawings.

It will be understood that when an element or layer is referred to as being "on," "interposed," "disposed," or "between" another element or layer, it can be directly on, interposed, disposed, or between the other element or layer or intervening elements or layers may be present.

It will be understood that, although the terms first, second, third, and the like may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, first element, component, region, layer or section discussed below could be termed second element, component, region, layer or section without departing from the teachings of the present invention.

As used herein, the singular forms "a," "an" and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the drawings, like reference numerals denote like elements and the thickness of layer or regions may be exaggerated for clarity.

A nanocrystal mixture according to an embodiment comprises two or more kinds of semiconductor nanocrystals. The respective kinds of nanocrystals emit light having different wavelengths in different regions of the electromagnetic spectrum. Each kind of semiconductor nanocrystal with the same photo luminescence is separately clustered to form a composite. The semiconductor nanocrystals may be passivated with a polymer material or a metallic oxide.

In one embodiment, the nanocrystal mixture comprises a first semiconductor nanocrystal and a second semiconductor nanocrystal, the first and second nanocrystal emitting lights of different wavelengths from each other, the first and second semiconductor nanocrystals being clustered into a plurality of first groups and a plurality of second groups respectively. The first and second groups take in the form of first and second composites respectively.

As will be detailed below, the first and the second semiconductor nanocrystals comprise Group II-VI, Group III-V, Group IV-VI, Group IV compounds, and a mixture thereof.

Semiconductor nanocrystals denote nanometer-sized semiconductor materials that exhibit quantum confinement effects. Semiconductor nanocrystals have a diameter of several nanometers (ca. 1-10 nanometers (nm)). Various factors (e.g., composition and size) of semiconductor nanocrystals may be controlled to obtain light having a desired wavelength from the semiconductor nanocrystals. That is, light of various wavelengths, including blue, green and red wavelengths, can be realized from semiconductor nanocrystals.

The nanocrystal mixture can be formed in the form of a thin film, which can be used as light-emitting layers in a variety of electronic devices. In this case, semiconductor nanocrystals emitting light of various wavelengths corresponding to different colors are grouped separately so as to form different composites, as illustrated in FIG. 4.

Figure 4:
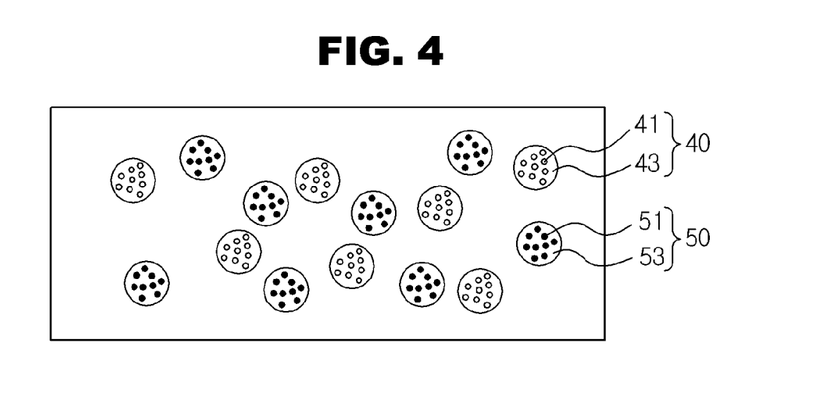
FIG. 4 is a schematic cross-sectional diagram showing light-emitting semiconductor nanocrystal materials distributed in a white light-emitting diode.

Referring to FIG. 4, the respective group of semiconductor nanocrystals, which emits light having the same wavelength, is formed as a separate composite. For example, green emitting nanocrystals are grouped and formed into green emitting nanocrystal composites 40 and red emitting nanocrystals are grouped and formed into red emitting nanocrystal composites 50. The green emitting nanocrystal composite 40 includes green emitting semiconductor nanocrystals 41 and transparent matrix 43. The red emitting nanocrystal composite 50 includes red emitting nanocrystals 51 and transparent matrix 53. The transparent matrix may be composed of either an organic polymer or a metallic oxide.

The nanocrystal mixture may be used to form a light-emitting layer of a white light-emitting device such as a white LED. In this case, in the nanocrystal mixture, one of two kinds of light-emitting semiconductor nanocrystal composites is composed of red emitting nanocrystals and the other kind thereof is composed of green emitting nanocrystals.

Materials for the semiconductor nanocrystals comprise Group II-VI, Group III-V, Group IV-VI, Group IV compounds, and a mixture thereof.

Specifically, the Group II-VI compounds comprise binary compounds such as CdSe, CdTe, ZnS, ZnSe, ZnTe, ZnO, HgS, HgSe and HgTe; ternary compounds such as CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS and HgZnSe; and quaternary compounds such as CdZnSeS, CdZnSeTe, CdZnSTe, CdHgSeS, CdHgSeTe, CdHgSTe, HgZnSeS, HgZnSeTe and HgZnSTe.

The Group III-V compounds comprise binary compounds, e.g., GaN, GaP, GaAs, GaSb, AlN, AlP, AlAs, AlSb, InN, InP, InAs and InSb; ternary compounds, e.g., GaNP, GaNAs, GaNSb, GaPAs, GaPSb, AlNP, AlNAs, AlNSb, AlPAs, AlPSb, InNP, InNAs, InNSb, InPAs, InPSb and GaAlNP; and quaternary compounds, e.g., GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs and InAlPSb.

The Group IV-VI compounds comprise binary compounds such as SnS, SnSe, SnTe, PbS, PbSe and PbTe; ternary compounds such as SnSeS, SnSeTe, SnSTe, PbSeS, PbSeTe, PbSTe, SnPbS, SnPbSe and SnPbTe; and quaternary compounds such as SnPbSSe, SnPbSeTe and SnPbSTe.

The Group IV compounds comprise unary elements such as Si and Ge; and binary compounds such as SiC and SiGe.

The semiconductor nanocrystals may further include an overcoating formed on the outer surface thereof in a way to form a core-shell structure. The overcoating is formed of a compound selected from Group II-VI compounds, Group III-V compounds, Group IV-VI compounds, Group IV compounds, and a mixture thereof.

Specifically, the Group II-VI compounds comprise binary compounds such as CdS, CdSe, CdTe, ZnS, ZnSe, ZnTe, ZnO, HgS, HgSe and HgTe, ternary compounds such as CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS and HgZnSe, and quaternary compounds such as CdZnSeS, CdZnSeTe, CdZnSTe, CdHgSeS, CdHgSeTe, CdHgSTe, HgZnSeS, HgZnSeTe and HgZnSTe. The Group III-V compounds comprise binary compounds such as GaN, GaP, GaAs, GaSb, AlN, AlP, AlAs, AlSb, InN, InP, InAs and InSb, ternary compounds such as GaNP, GaNAs, GaNSb, GaPAs, GaPSb, AlNP, AlNAs, AlNSb, AlPAs, AlPSb, InNP, InNAs, InNSb, InPAs, InPSb, GaAlNP, AlGaN, AlGaP, AlGaAs, AlGaSb, InGaN, InGaP, InGaAs, InGaSb, AlInN, AlInP, AlInAs and AlInSb, and quaternary compounds such as GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs and InAlPSb. The Group IV-VI compounds comprise binary compounds such as SnS, SnSe, SnTe, PbS, PbSe and PbTe, ternary compounds such as SnSeS, SnSeTe, SnSTe, PbSeS, PbSeTe, PbSTe, SnPbS, SnPbSe and SnPbTe, and quaternary compounds such as SnPbSSe, SnPbSeTe and SnPbSTe. The Group IV compounds comprise unary elements such as Si and Ge, and binary compounds such as SiC and SiGe.

When the semiconductor nanocrystals are intended to be used as light-emitting materials, they may have a multi-layered structure such as core-shell nanocrystals. Each layer may be composed of two different kinds of nanocrystal materials. The multilayer structure of the semiconductor nanocrystals may comprise one or more alloy interlayers, each being composed of different materials constituting the adjacent layers, at the interfaces between the respective layers. The alloy interlayers may be composed of a gradient alloy having a composition gradient of the materials. A multilayered structure including alloy layers is disclosed in U.S. patent application Ser. Nos. 11/831,437 and 11/849,587, the entire contents of which are incorporated herein by reference.

The composites may be composed of semiconductor nanocrystals and either an organic polymer or a metallic oxide. Any organic polymer that is transparent and curable in the wavelength band of 330-650 nm is suitable. Specifically, the organic polymer comprises acrylic polymers such as polymethylmethacrylate (PMMA) and its derivatives, polystyrene copolymers such as polystyrene (PS) and its derivatives, polyvinylarylene polymers such as poly(1-vinylnaphthalene) (PVN) and its derivatives, polybutadiene copolymers, polyisobutylene copolymers, phenolic polymers such as poly(4-vinylphenol) (PVP) and its derivatives, novolac resins, imide polymers, aryl ether polymers, amide polymers, wholly or partially fluorinated fluoropolymers, p-xylene polymer such as parylene and its derivatives, vinyl alcohol polymers such as polyvinylalcohol (PVA) and its derivatives, methyl siloxane polymers, and a combination thereof.

Any metal oxide that is transparent and curable in the wavelength band of 330-650 nm is suitable. Specifically, the metal oxide comprises $TiO_2$, $ZnO$, $SiO_2$, $SnO_2$, $WO_3$, $Ta_2O_3$, $BaTiO_3$, $BaZrO_3$, $ZrO_2$, $HfO_2$, $Al_2O_3$, $Y_2O_3$ and $ZrSiO_4$.

Figure 5A:
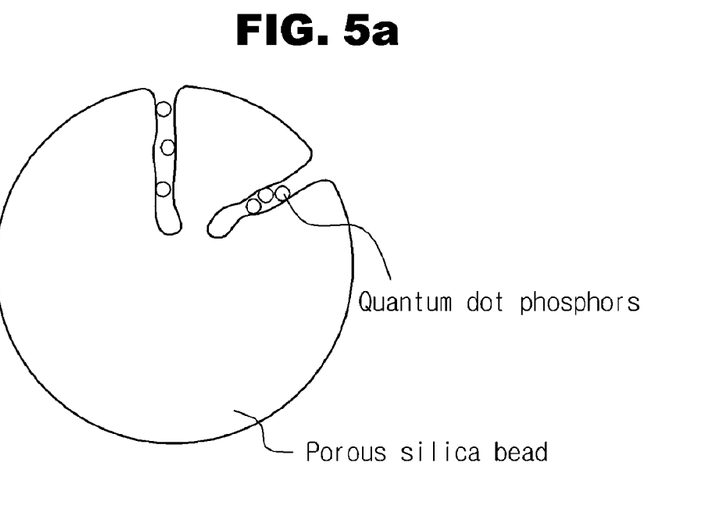
FIG. 5a is a schematic diagram illustrating a method of preparing a light-emitting semiconductor nanocrystal composite using a precipitation method.
Figure 5B:
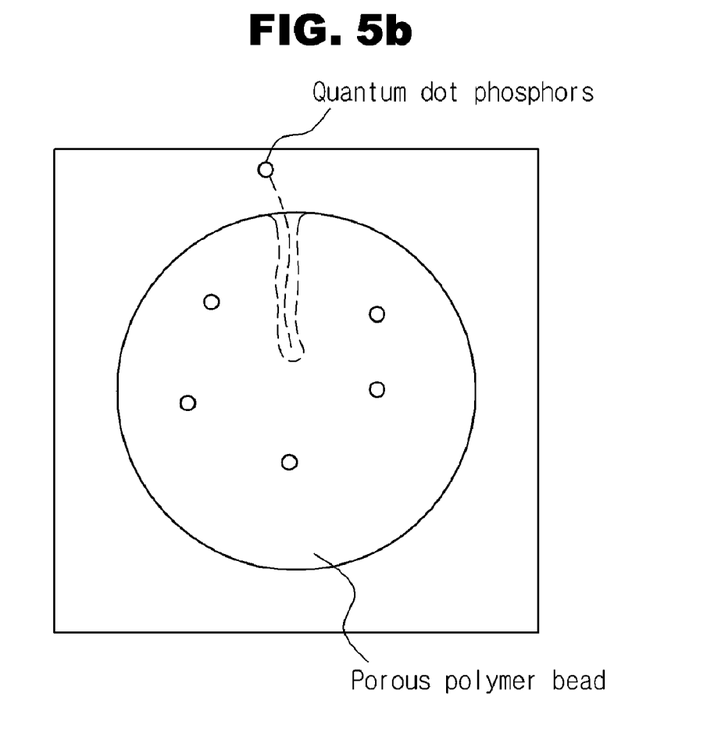
FIG. 5b is a schematic diagram illustrating a method of preparing a light-emitting semiconductor nanocrystal composite using a polymer swelling method.
Figure 5C:
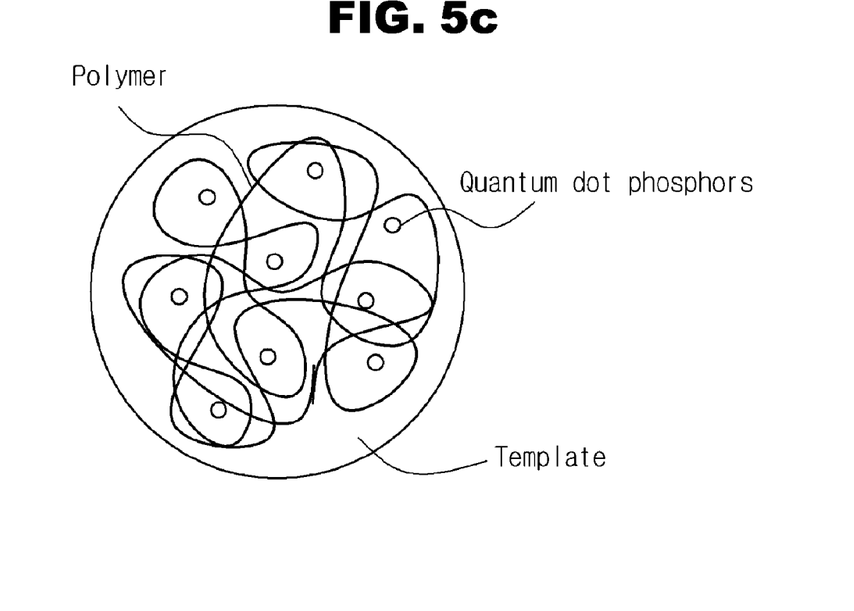
FIG. 5c is a schematic diagram illustrating a method of preparing a light-emitting semiconductor nanocrystal composite using an emulsion polymerization method.

The composites included in the nanocrystal mixture can be prepared by various methods known in the art, as illustrated in FIGS. 5a, 5b and 5c.

Specifically, FIG. 5a is a schematic diagram illustrating a method of preparing a light-emitting semiconductor nanocrystal composite through a precipitation method. In the precipitation method, porous silica beads are dipped in a dispersion solution containing semiconductor nanocrystals so that the semiconductor nanocrystals are introduced into the pores of the porous silica beads, thereby forming a semiconductor nanocrystals composite.

FIG. 5b is a schematic diagram illustrating a method of preparing a light-emitting semiconductor nanocrystal composite through a polymer swelling method. In the polymer swelling method, porous polymer beads are dipped and then swollen in a solution of organic semiconductor nanocrystals in an organic solvent such that the organic semiconductor nanocrystals are introduced into the pores of the polymer beads. Then, the polymer beads are taken out of the solution and dried to shrink the pores of the polymer beads. As a result, the semiconductor nanocrystals are trapped inside of the pores of the polymer beads to thereby form a semiconductor nanocrystals composite.

FIG. 5c is a schematic diagram illustrating a method of preparing a light-emitting semiconductor nanocrystal composite using a template through an emulsion polymerization method. In the emulsion polymerization method, an organic polymer is synthesized in the presence of semiconductor nanocrystals to prepare composites in which the semiconductor nanocrystals are distributed within the organic polymer matrix. Alternatively, composites can be prepared by powdering a monolithic material containing semiconductor nanocrystals.

The nanocrystal mixture may further comprise different kinds of organic or inorganic phosphors to achieve improved luminescent properties, such as high luminescence efficiency and good color purity.

In another embodiment, a white light-emitting diode is formed using semiconductor nanocrystals. Specifically, the white light-emitting diode of this embodiment comprises a blue light-emitting diode and a light-emitting layer formed on the blue light-emitting diode. The light emitting layer is composed of two or more kinds of semiconductor nanocrystals emitting light in different wavelength regions to produce a color complementary to blue. In the light-emitting layer, the semiconductor nanocrystals of each group having same photo luminescence are passivated in the composites. The light from the blue light-emitting diode is mixed with the color produced from the light-emitting layer to emit white light.

The semiconductor nanocrystals emitting light in different wavelength regions can be materials having a bandgap energy sufficient to absorb a wavelength from the LED as a light source and convert the wavelength to a wavelength about 10 nm longer.

Figure 6:
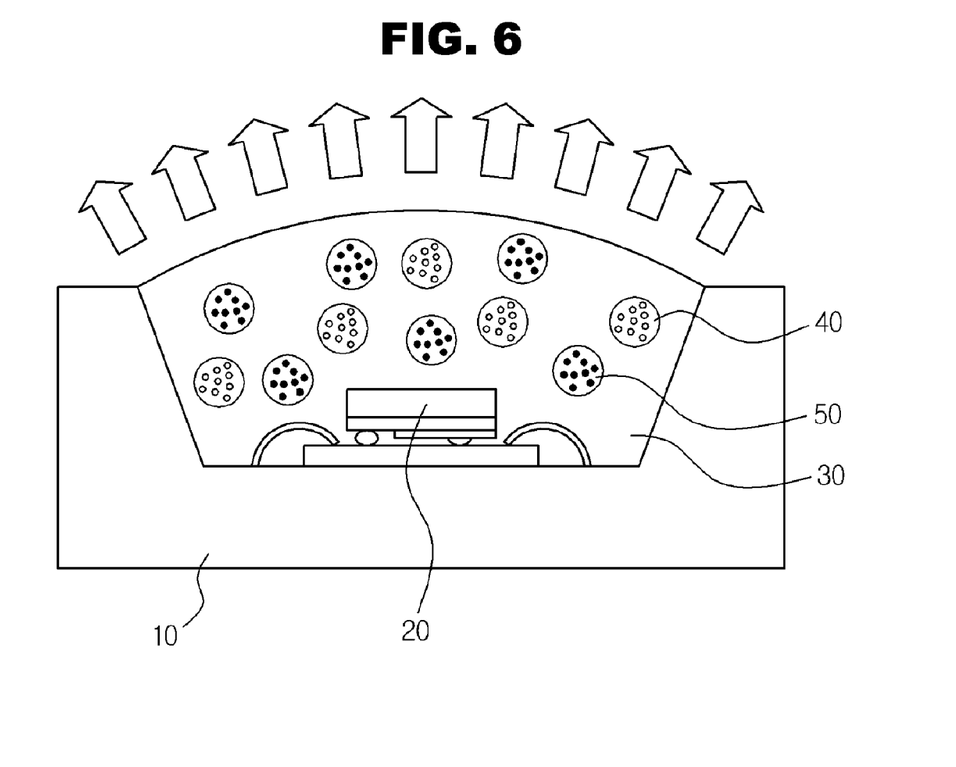
FIG. 6 is a schematic cross-sectional diagram of a white light-emitting diode.

FIG. 6 is a schematic cross-sectional diagram of a white light-emitting diode according to an embodiment. As shown in FIG. 6, the white light-emitting diode comprises a packaging frame 10, a blue light-emitting diode chip 20 disposed on the packaging frame 10 and a light-emitting layer covering the blue light-emitting diode chip 20 wherein the blue light-emitting diode chip is composed of a p-type semiconductor and an n-type semiconductor, and the light-emitting layer is composed of light-emitting materials and a transparent resin matrix. The light-emitting materials are green emitting nanocrystal composites 40 and red emitting nanocrystal composites 50. The transparent resin matrix surrounds the light-emitting materials. The p-type and n-type semiconductors of the blue light-emitting diode chip 20 are connected to respective electrodes by wires 30.

The blue light-emitting diode 20 emits UV or blue light in the wavelength range of 360-440 nm to excite the semiconductor nanocrystals present within the semiconductor nanocrystal composites of the light-emitting layer. The blue light-emitting diode 20 may employ a UV-emitting device such as a GaN-based light-emitting device.

The semiconductor nanocrystals may be selected from Group II-VI, Group III-V, Group IV-VI, Group IV compounds, and a mixture thereof. Specifically, the Group II-VI compounds comprise binary compounds such as CdSe, CdTe, ZnS, ZnSe, ZnTe, ZnO, HgS, HgSe and HgTe; ternary compounds such as CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS and HgZnSe; and quaternary compounds such as CdZnSeS, CdZnSeTe, CdZnSTe, CdHgSeS, CdHgSeTe, CdHgSTe, HgZnSeS, HgZnSeTe and HgZnSTe.

The Group III-V compounds comprise binary compounds such as GaN, GaP, GaAs, GaSb, AlN, AlP, AlAs, AlSb, InN, InP, InAs and InSb; ternary compounds such as GaNP, GaNAs, GaNSb, GaPAs, GaPSb, AlNP, AlNAs, AlNSb, AlPAs, AlPSb, InNP, InNAs, InNSb, InPAs, InPSb and GaAlNP; and quaternary compounds such as GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs and InAlPSb.

The Group IV-VI compounds comprise binary compounds such as SnS, SnSe, SnTe, PbS, PbSe and PbTe; ternary compounds such as SnSeS, SnSeTe, SnSTe, PbSeS, PbSeTe, PbSTe, SnPbS, SnPbSe and SnPbTe; and quaternary compounds such as SnPbSSe, SnPbSeTe and SnPbSTe. The Group IV compounds comprise unary compounds such as Si and Ge; and binary compounds such as SiC and SiGe.

The semiconductor nanocrystals are passivated by an organic polymer or a metal oxide. Any organic polymer that is transparent and curable in the wavelength band of 330-650 nm may be used for passivation. Specifically, the organic polymer comprises acrylic polymers such as polymethylmethacrylate (PMMA) and its derivatives, polystyrene copolymers such as polystyrene (PS) and its derivatives, polyvinylarylene polymers such as poly(1-vinylnaphthalene) (PVN) and its derivatives, polybutadiene copolymers, polyisobutylene copolymers, phenolic polymers such as poly(4-vinylphenol) (PVP) and its derivatives, novolac resins, imide polymers, aryl ether polymers, amide polymers, wholly or partially fluorinated fluoropolymers, p-xylene polymer such as parylene and its derivatives, vinyl alcohol polymers such as polyvinylalcohol (PVA) and its derivatives, methyl siloxane polymers, and a combination thereof.

Any metal oxide that is transparent and curable in the wavelength band of 330-650 nm may be used for the passivation. Specifically, suitable metal oxides comprise $TiO_2$, ZnO, $SiO_2$, $SnO_2$, $WO_3$, $Ta_2O_3$, $BaTiO_3$, $BaZrO_3$, $ZrO_2$, $HfO_2$, $Al_2O_3$, $Y_2O_3$ and $ZrSiO_4$.

The white light-emitting diode may be used in backlight units for a variety of displays, including liquid crystal displays. A typical backlight unit comprises a substrate, a flat light guide plate disposed on the substrate, and a plurality of light-emitting diodes arranged in an array beside the light guide plate. Since the white light-emitting diode of the embodiment has high light conversion efficiency, it can be used for the manufacture of large-area liquid crystal displays as well as backlight units for small displays (e.g., cell phones). In addition, the white light-emitting diode can find applications in paper-thin light sources, dome lights for automotive vehicles, light sources for lighting, and the like.

The following examples are given for the purpose of illustration only and are not intended to limit the present invention.

EXAMPLES

Preparation for Example 1

Synthesis of Red Emitting CdSe/CdS/ZnS Nanocrystals 200 mL of trioctylamine (TOA), 5.4 g of oleic acid and 0.618 g of cadmium oxide were put into a round-bottom flask equipped with a reflex condenser. The mixture was allowed to react while stirring maintaining the reaction temperature at 300° C. to obtain a reaction product. Separately, a selenium (Se) powder was dissolved in trioctylphosphine (TOP) to obtain a Se-TOP complex solution (Se concentration: ca. 0.2 M). 6 mL of the Se-TOP complex solution was rapidly fed to the reaction product to react for 1.5 minutes. To the reaction product, a mixture of 2.4 mmol of octanethiol and 2 mL of TOA was slowly added dropwise. The resulting mixture was allowed to react for 30 minutes. 16 mmol of zinc acetate was dissolved in 4 mL of TOA, then a mixture of 20 mmol of octanethiol and 4 mL of TOA was slowly added dropwise thereto, followed by reaction for 60 minutes.

After the reaction was finished, the reaction mixture was rapidly cooled down to room temperature. Ethanol as a non-solvent was added to the reaction mixture, followed by centrifugation. The supernatant was decanted and the precipitate was dispersed in toluene to prepare a dispersion of CdSe/CdS/ZnS nanocrystals (3 g). The resulting nanocrystals were found to emit light of a wavelength of 602 nm. The luminescence efficiency of the nanocrystals was 76% with respect to that of Rhodamine 6G. The absorption and luminescence spectra of the nanocrystals are shown in FIG. 3.

Preparation for Example 1

Synthesis of Green Emitting CdSe/CdS/ZnS Nanocrystals 16 g of trioctylamine (TOA), 0.3 g of octadecylphosphonic acid and 0.4 mmol of cadmium oxide were put into a 125-ml flask equipped with a reflux condenser. The mixture was allowed to react while stirring and maintaining the reaction temperature at 300° C. to obtain a reaction product. Separately, 1.58 g of selenium (Se) powder was dissolved in 10 ml of trioctylphosphine (TOP) to obtain a Se-TOP complex solution (Se concentration: ca. 2 M). 2 mL of the Se-TOP complex solution was rapidly fed to the reaction product and the reaction was allowed to proceed for about 2 minutes. After the reaction was finished, the reaction product was rapidly cooled down to room temperature. Ethanol as a non-solvent was added to the reaction product, followed by centrifugation. The precipitate was separated from the supernatant and dispersed in toluene to prepare a dispersion of CdSe nanocrystals emitting light at 485 nm.

8 g of TOA, 0.1 g of oleic acid and 0.4 mmol of zinc acetate were put into a 125 mL flask equipped with a reflux condenser. The mixture was allowed to react while stirring and maintaining the reaction temperature at 300° C. to obtain a reaction product. The CdSe nanocrystal solution was added to the reaction product, and then a S-TOP complex solution was slowly added thereto. The resulting mixture was allowed to react for about one hour to grow ZnS nanocrystals on the surface of the CdSe nanocrystals and diffuse the nanocrystals along the interface between the nanocrystals to form an alloy interlayer at the interface. As a result, CdSe//ZnS nanocrystals having the alloy interlayer formed at the interface between the CdSe and ZnS nanocrystals (hereinafter, referred to as 'CdSe//ZnS nanocrystals') were prepared. After completion of the reaction, the reaction mixture was rapidly cooled down to room temperature. Ethanol as a non-solvent was added to the reaction product, followed by centrifugation. The supernatant was decanted and the precipitate was dispersed in toluene to prepare a dispersion of the CdSe//ZnS nanocrystals. The CdSe//ZnS nanocrystals were found to have a size of 5 nm and emit light at 458 nm.

8 g of TOA, 0.1 g of oleic acid, 0.05 mmol of cadmium oxide and 0.4 mmol of zinc acetate were put into a 125 mL flask equipped with a reflux condenser. The mixture was allowed to react while stirring and maintaining the reaction temperature at 300° C. to obtain a reaction product. The solution of the CdSe//ZnS nanocrystals was added to the reaction product, and then a S-TOP complex solution was slowly added thereto. The resulting mixture was allowed to react for about one hour to grow CdSZnS nanocrystals on the surface of the CdSe//ZnS nanocrystals. As a result, CdSe//ZnS/CdSZnS nanocrystals emitting light at 535 nm were prepared. After completion of the reaction, the reaction product was rapidly cooled down to room temperature. Ethanol as a non-solvent was added to the reaction mixture, followed by centrifugation. The precipitate was separated from the supernatant and dispersed in toluene to prepare a dispersion of the CdSe//ZnS/CdSZnS nanocrystals. The nanocrystals were found to have a quantum efficiency of 93%. The absorption and luminescence spectra of the nanocrystals are shown in FIG. 3.

Example 1

Preparation of Nanocrystals-Silica Composites

Ethanol was added to 1 mL of the toluene solution of the red emitting CdSe/CdS/ZnS (1 wt %) prepared in Preparative Example 1, followed by centrifugation to obtain a precipitate. The precipitate was collected. Pyridine was added to the precipitate and stirred until the solution became transparent. Hexane was added to the pyridine solution of the nanocrystals to obtain a precipitate. The precipitate was collected, dissolved in a solution (100 µl) of 6-mercaptohexanol and propylamine in pyridine, and stirred for about 2 hours. The addition of hexane to the solution gave a precipitate. 200 µl of tetraethoxyorthosilane (TEOS), 100 µl of ethanol, 100 µl of propylamine and 50 µl of water were added to the precipitate, stirred, put into a circular template, and dried at room temperature to prepare CdSe/CdS/ZnS nanocrystals-silica composites.

CdSe//ZnS/CdSZnS nanocrystals-silica composites were prepared in the same manner as described above except that the toluene solution of the green emitting CdSe//ZnS/CdSZnS nanocrystals (1 wt %) prepared in Preparative Example 2 was used.

The red emitting CdSe/CdS/ZnS nanocrystals-silica composites and the green emitting CdSe//ZnS/CdSZnS nanocrystals-silica composites were powdered and mixed together in the same ratio. 0.1 g of the mixture was mixed with 1 mL of an epoxy resin (4500, SJC chemical). About 10 microliters (µl) of the resulting mixture was applied to a blue light-emitting diode and cured at 100° C. for 3 hours to fabricate a white light-emitting diode.

Figure 7:
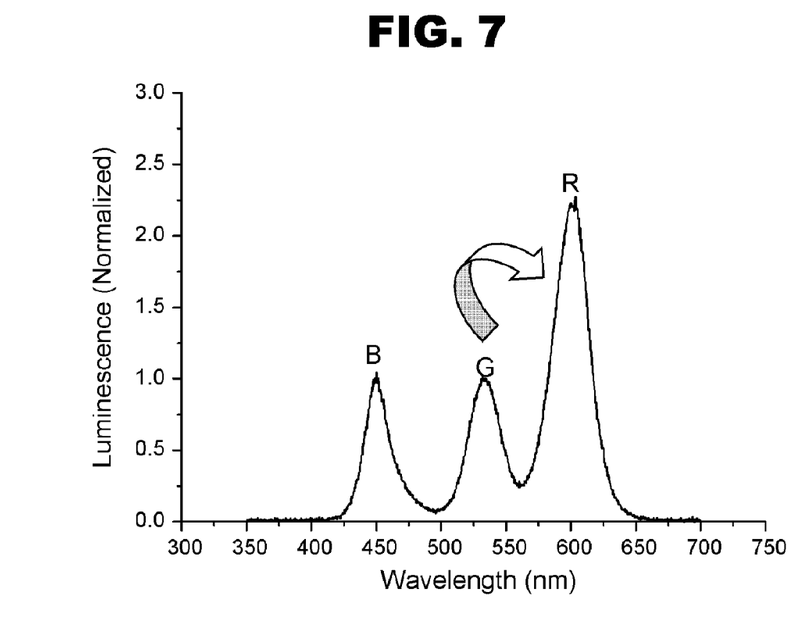
FIG. 7 is the luminescence spectrum for the white light-emitting diode fabricated in Example 1.

The luminescence spectrum of the white light-emitting diode was analyzed by evaluating the luminescent properties of the light collected in an integrating sphere using an ISP75 system. The luminescence intensities of the blue LED, the green emitting nanocrystals-silica composites and the red emitting nanocrystals-silica composites are shown in FIG. 7.

Comparative Example 1

Preparation of Nanocrystals-Silica Composites

The toluene solution (1 mL) of the red emitting CdSe/CdS/ZnS nanocrystals prepared in Preparative Example 1 was mixed with the toluene solution (1 mL) of the green emitting CdSe//ZnS/CdSZnS nanocrystals (1 wt %) prepared in Preparative Example 2. Ethanol was added to the mixture and centrifuged to obtain a precipitate. The precipitate was collected. Pyridine was added to the precipitate and stirred until the solution became transparent. Hexane was added to the pyridine solution of the nanocrystals to obtain a precipitate. The precipitate was collected, dissolved in a solution (200 µl) of 6-mercaptohexanol and propylamine in pyridine, and stirred for about 2 hours. The addition of hexane to the solution gave a precipitate. 400 µl of tetraethoxyorthosilane (TEOS), 200 µl of ethanol, 200 µl of propylamine and 100 µl of water were added to the precipitate, stirred, put into a circular template, and dried at room temperature to prepare silica composites in which the CdSe/CdS/ZnS nanocrystals were mixed with the CdSe//ZnS/CdSZnS nanocrystals.

The nanocrystals-silica composites were powdered. 0.1 g of the powder was mixed with 1 mL of an epoxy resin (4500, SJC chemical). About 10 µl of the resulting mixture was applied to a blue light-emitting diode and cured at 100° C. for 3 hours to fabricate a white light-emitting diode.

The luminescence spectrum of the white light-emitting diode was analyzed by evaluating the luminescent properties of the light collected in an integrating sphere using an ISP75 system. The luminescence intensities of the blue LED and the nanocrystals-silica composites are shown in FIG. 8.

Figure 8:
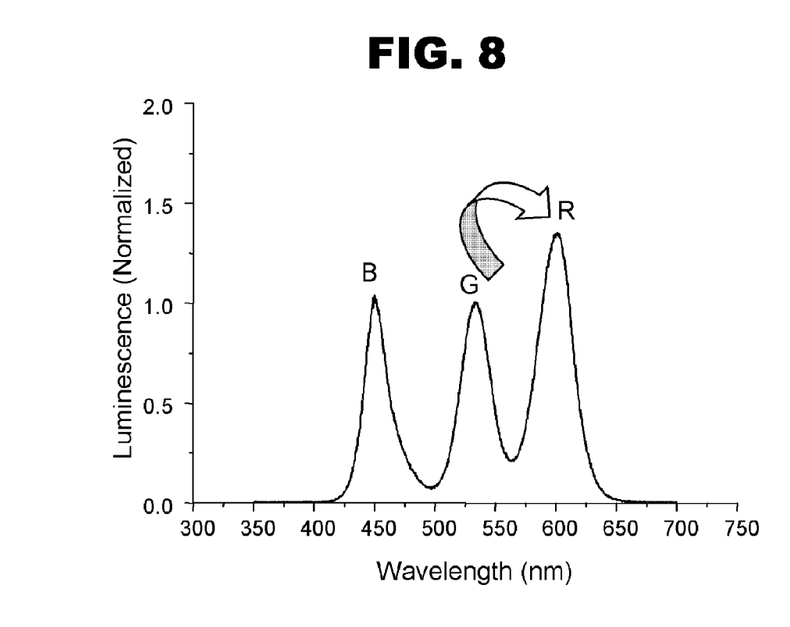
FIG. 8 is the luminescence spectrum for the white light-emitting diode fabricated in Comparative Example 1.

The graphs of FIGS. 7 and 8 demonstrate that the red light emission of the white light-emitting diode fabricated in Comparative Example 1 was more intense due to energy transfer between the nanocrystals.

As apparent from the above description, since each group of semiconductor nanocrystals with same photo luminescence are passivated in the composites, reduction in fluorescence resulting from energy transfer between different kinds of semiconductor nanocrystals is minimized to provide improved efficiency of light to the nanocrystal mixture.

In addition, semiconductor nanocrystals emitting light of different wavelengths are grouped separately into composites according to the kind of the semiconductor nanocrystals before mixing to ensure sufficient distances between the respective semiconductor nanocrystals, so that a decrease in energy due to absorption-reabsorption between different kinds of semiconductor nanocrystals can be minimized to provide high efficiency of light to the nanocrystal mixture. Therefore, the nanocrystal mixture is used to fabricate a white light-emitting diode with good color purity and high luminescence efficiency. The white light-emitting diode using the nanocrystal mixture can find applications in light sources for backlight units and lighting devices.

Furthermore, the nanocrystal mixture can be formed into a monolayer as a light-emitting layer of a light-emitting device without the need for the formation of two or more independent layers in order to minimize reduction in fluorescence resulting from energy transfer between semiconductor nanocrystals emitting light of different wavelengths. Therefore, the use of the nanocrystal mixture for the formation of a light-emitting layer of a light-emitting device improves the processability of the light-emitting layer, thus contributing to a reduction in the fabrication cost of the light-emitting device.

While disclosed embodiments have been described in detail with reference to its exemplary embodiments, the embodiments are simply for the purpose of illustration. It will be understood by those skilled in the art that various modifications and their equivalents can be made without departing from the spirit and scope of the invention In addition, many modifications can be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguished one element from another. Furthermore, the use of the terms a, an, etc. do not denote a limitation of quantity, but rather denote the presence of at least one of the referenced item.

What is claimed is:

1. A nanocrystal mixture comprising:
a plurality of homogeneous composites homogeneously dispersed in a matrix; wherein each composite comprises a porous silica bead with semiconductor nanocrystals entrapped in the pores of the porous silica bead or wherein each composite comprises a porous polymer bead with the semiconductor nanocrystals entrapped in the pores of the porous polymer bead; wherein at least some composites emit light of a different wavelength from that emitted by other composites; and wherein the composites are spaced apart from one another at a distance of at least 50 nm.

2. The nanocrystal mixture according to claim 1, wherein the semiconductor nanocrystals are selected from the group consisting of Group II-VI, Group III-V, Group IV-VI, Group IV compounds, and a mixture thereof.

3. The nanocrystal mixture according to claim 2, wherein the Group II-VI compounds are selected from the group consisting of: binary compounds, CdSe, CdTe, ZnS, ZnSe, ZnTe, ZnO, HgS, HgSe, HgTe; ternary compounds, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe; and quaternary compounds, CdZnSeS, CdZnSeTe, CdZnSTe, CdHgSeS, CdHgSeTe, CdHgSTe, HgZnSeS, HgZnSeTe, HgZnSTe,
  the Group III-V compounds are selected from the group consisting of: binary compounds, GaN, GaP, GaAs, GaSb, MN, AlP, AlAs, AlSb, InN, InP, InAs, InSb; ternary compounds, GaNP, GaNAs, GaNSb, GaPAs, GaPSb, ANP, ANAs, ANSb, AlPAs, AlPSb, InNP, InNAs, InNSb, InPAs, InPSb and GaAlNP; and quaternary compounds, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb,
  the Group IV-VI compounds are selected from the group consisting of: binary compounds, SnS, SnSe, SnTe, PbS, PbSe and PbTe; ternary compounds, SnSeS, SnSeTe, SnSTe, PbSeS, PbSeTe, PbSTe, SnPbS, SnPbSe SnPbTe; and quaternary compounds, SnPbSSe, SnPbSeTe, SnPbSTe, and
  the Group IV compounds are selected from the group consisting of: unary compounds, Si and Ge; and binary compounds, SiC and SiGe.

4. The nanocrystal mixture according to claim 1, wherein the semiconductor nanocrystals are passivated by an organic polymer or a metallic oxide.

5. The nanocrystal mixture according to claim 4, wherein the organic polymer is transparent and curable in a wavelength band of 330-650 nm.

6. The nanocrystal mixture according to claim 4, wherein the organic polymer is selected from the group consisting of: acrylic polymers, polymethylmethacrylate and its derivatives; polystyrene copolymers, polystyrene and its derivatives; polyvinylarylene polymers, poly(l-vinylnaphthalene) and its derivatives; polybutadiene copolymers; polyisobutylene copolymers; phenolic polymers, poly(4-vinylphenol) and its derivatives; novolac resins; imide polymers; aryl ether polymers; amide polymers; wholly or partially fluorinated fluoropolymers; p-xylene polymer, parylene derivatives; vinyl alcohol polymers, polyvinylalcohol and its derivatives; methyl siloxane polymers; and a combination thereof.

7. The nanocrystal mixture according to claim 4, wherein the metallic oxide is transparent and curable in a wavelength band of 330-650 nm.

8. The nanocrystals mixture according to claim 4, wherein the metallic oxide is selected from the group consisting of $TiO_2$, $ZnO$, $SiO_2$, $SnO_2$, $WO_3$, $Ta_2O_3$, $BaTiO_3$, $BaZrO_3$, $ZrO_2$, $HfO_2$, $Al_2O_3$, $Y_2O_3$ and $ZrSiO_4$.

* * * * *